United States Patent [19]

Shedden

[11] 4,441,736
[45] Apr. 10, 1984

[54] DEVICE FOR REDUCING WEAR IN VEHICLE SUSPENSION SYSTEMS

[76] Inventor: Joel T. Shedden, P.O. Box 628, Lake Elsinore, Calif. 92330

[21] Appl. No.: 377,350

[22] Filed: May 12, 1982

[51] Int. Cl.³ .............................................. B60R 27/00
[52] U.S. Cl. ...................................... 280/754; 211/22; 248/354.3; 248/354.4; 254/133 R; 280/402; 410/2; 410/3
[58] Field of Search ........................ 254/133 R, 134; 248/354 P, 354 S, 357; 211/20, 21, 22; 410/7, 9, 10, 11, 23, 2, 3, 156; 280/754, 755, 727, 402; 180/199

[56] References Cited

U.S. PATENT DOCUMENTS

| | | | |
|---|---|---|---|
| 1,517,648 | 12/1924 | Larson | 280/754 X |
| 1,707,226 | 4/1929 | Kepple | 248/354 P |
| 2,247,009 | 6/1941 | Averill | 280/754 |
| 2,413,290 | 12/1946 | Carter | 280/754 |
| 2,684,222 | 7/1954 | Miller | 248/354 S |
| 2,735,692 | 2/1956 | Vogt | 280/754 |
| 3,430,983 | 3/1969 | Jones | 280/402 |

FOREIGN PATENT DOCUMENTS 1118396  3/1956  France ................................ 280/402

Primary Examiner—Joseph F. Peters, Jr.
Assistant Examiner—Mitchell J. Hill
Attorney, Agent, or Firm—John H. Crowe

[57] ABSTRACT

A pair of relatively adjustable elongate struts adapted to be inserted between a part of a motorcycle chassis and a supporting wheel to block flexing of the motorcycle suspension system when the motorcycle is being hauled on a carrier over rough terrain or the like. A device is provided at the remote end of one of the struts to interlock with the tread of the wheel tire and another element is provided at the remote end of the other strut to interlock with the chassis part to prevent dislodging of the struts due to bouncing of the motorcycle while in transit. A locking ring is slidable into position to embrace both struts to lock the same in extended colinear relationship.

10 Claims, 5 Drawing Figures

U.S. Patent  Apr. 10, 1984  4,441,736
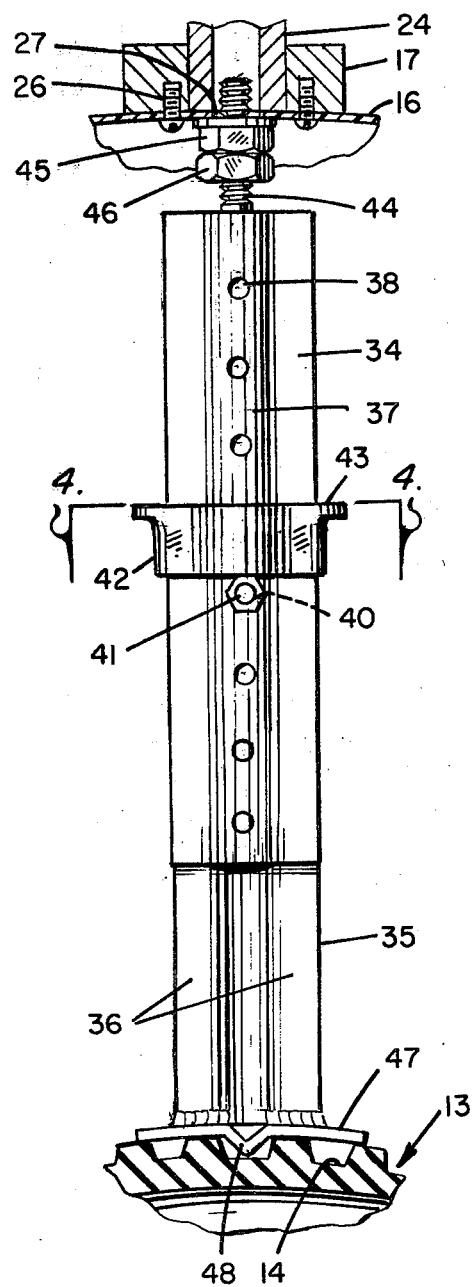
FIG. 2
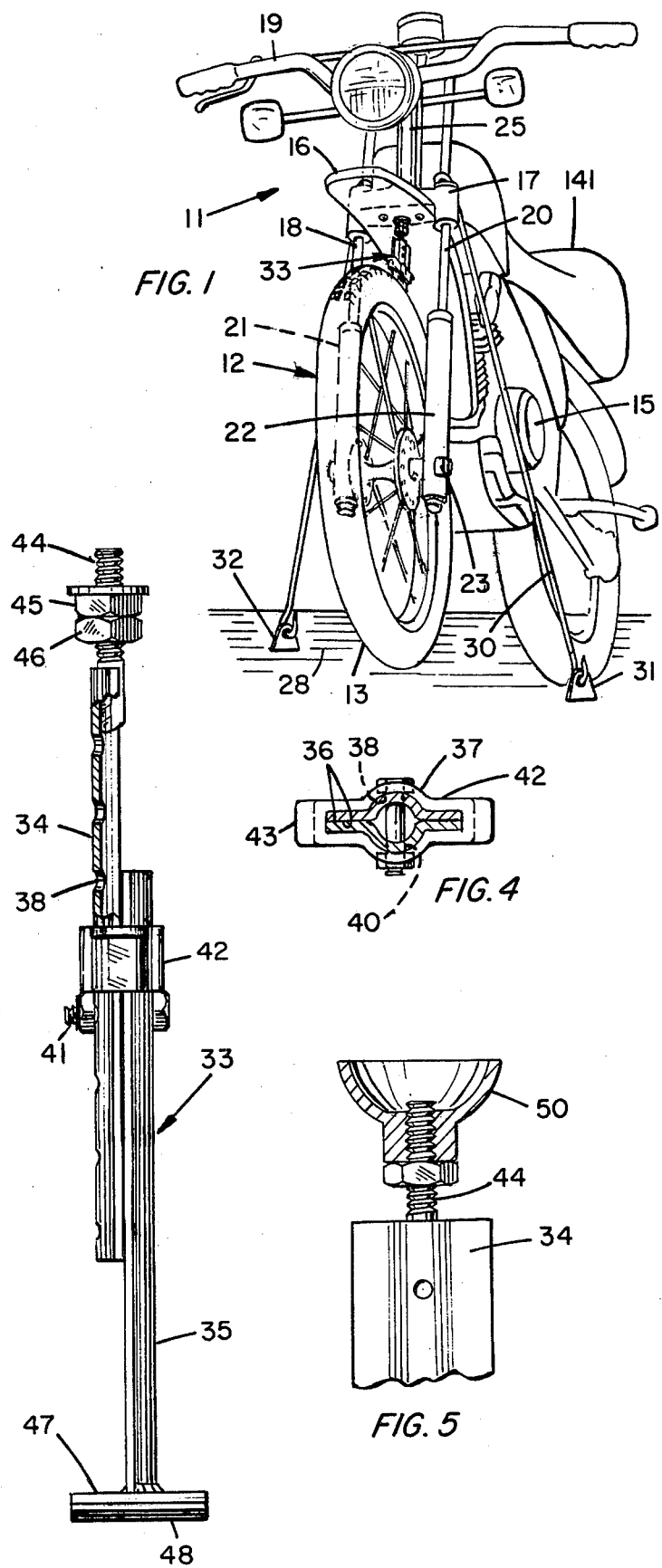
FIG. 1
FIG. 3
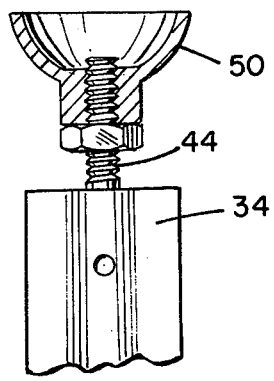
FIG. 4
FIG. 5

DEVICE FOR REDUCING WEAR IN VEHICLE SUSPENSION SYSTEMS

BACKGROUND OF THE INVENTION

1. Field of the Invention

This invention relates to vehicle suspension systems and has particular reference to a device for rendering the flexible suspension system of a vehicle immobile while the vehicle is being transported.

2 Description of the Prior Art

Vehicles, particularly racing motorcycles, offroad motorcycles, three-wheeled cycles, etc., are often transported considerable distances by trailers, trucks or the like to points of use. Such vehicles typically have shock-absorbing suspension systems with considerable vertical travel to absorb shocks encountered by the vehicle when it is being driven over rough, offroad terrain, a dirt racing track or the like.

Usually, a shock-absorbing suspension system of the above-mentioned type comprises telescoping tubular members connected between an axle of one of the vehicle wheels and a part of the vehicle chassis. A compression spring urges the tubular members toward relatively extended positions.

In transporting such a vehicle, it is customary to support the same upright on the floor of the transporting vehicle. During transit, especially when travelling over rough roads, the suspension system flexes considerably, even when the supported vehicle is held down by tie-down straps or the like which partially compress the suspension system. This results in unnecessary wear on the telescoping members and other parts of the suspension system, such as springs, oil seals, etc.

Heretofore, in an effort to reduce wear in such a suspension system, a stick of wood or the like has customarily been jumped or wedged between the tire of a vehicle support wheel and an overlying part of the chassis, such as the fender in the case of a motorcycle. Such an expedient is not entirely satisfactory because the stick has to be cut to fit the particular vehicle on which it is mounted. Also, it is difficult to wedge the stick into position and, further, it may become dislodged due to constant bouncing and jostling of the vehicle since it is held in position solely by friction between its ends and the wheel and chassis part of said vehicle.

It is therefore a principal object of the present invention to provide a device of the above type which is readily adjustable to fit vehicles of different types and sizes.

Another object of the invention is to provide a device of the above type which will not become dislodged by bouncing or vibration of the vehicle during transportation.

A further object of the invention is to provide a device of the above type which is compact, of light weight and simple and economical to manufacture.

SUMMARY OF THE INVENTION

According to the present invention, a blocking device is provided comprising a pair of interconnected elongate strut members adapted to be inserted between a vehicle chassis part and the tire of a vehicle supporting wheel to prevent flexing and consequent wear of the usual flexible vehicle suspension system while transporting the vehicle. Means are provided at the remote ends of the members to interlock with the chassis part and with the tread of the supporting wheel to prevent the device from being dislodged by bouncing or vibration of the vehicle. In a preferred form of the invention, the elongate members are connected together at selectively different points to enable the overall length of the device to be adjusted to fit a desired vehicle, and means are also provided to lock the members in colinear relation with each other. The device is of simple, lightweight and yet rugged and strong construction, and may be used on a large number of different sizes and styles of vehicles of the above-noted types.

BRIEF DESCRIPTION OF THE DRAWINGS

The manner in which the above and other objects of the invention are accomplished will be readily understood from the following description, when read in conjunction with the accompanying drawings, wherein:

FIG. 1 is a perspective view showing a motorcycle mounted in a transporting vehicle with a preferred form of blocking device in accordance with this invention mounted thereon.

FIG. 2 is a front elevational view of the blocking device, showing the same mounted between a vehicle tire and part of the supported vehicle chassis.

FIG. 3 is a side view of the device, partly in section.

FIG. 4 is a sectional view taken along the line 4—4 of FIG. 2.

FIG. 5 is a sectional view showing an attachment for the device for use with certain types of vehicles.

DESCRIPTION OF THE PREFERRED EMBODIMENT

While this invention can be embodied in many different forms, there is shown in the drawing and will be described a specific embodiment, with the understanding that this is to exemplify the principles of the invention and not limit it to that particular embodiment. The scope of the invention is limited only by the language of the appended claims.

Referring to the drawing, the vehicle chosen for illustration in connection with the preferred form of the invention is a motorcycle generally indicated at 11 having a pair of supporting wheels, the front one of which is shown at 12. The tire 13 (FIG. 2) of the wheel 12 has a tread including well-defined indentations 14 spaced therearound.

The wheels of motorcycle 11 support a chassis (including a seat 141, engine 15, front fender 16 and handlebars 19) through a flexible suspension system incorporated in the steering mechanism of the motorcycle. The latter comprises a fork including a bridge 17 to which are integrally attached tubular rods 18 and 20. The latter telescope within tubular rods 21 and 22, respectively, which are attached to the axle 23 of the wheel 12, and suitable compression springs (not shown) are interposed between the telescoping rods to normally hold the chassis in an elevated position. The bridge 17 is integrally attached to a hollow steering stem 24 (FIG. 2) which is pivotally mounted in a bearing tube 25 forming part of the chassis frame. The fender 16 is integrally attached to the bridge 17 by screws 26 and has an opening 27 therein aligned with the tubular stem 24, this opening having been formed to accommodate the blocking device of this invention in a manner soon to be described. As indicated above, suitable compression springs (not shown), forming part of the suspension system, are interposed between the sets of tubular rods 18, 21 and 20, 22 and these serve to cushion a rider against road shocks. Such springs enable considerable vertical flexing movement of the chassis which, in some cases, exceeds 12 inches.

When it is being transported, motorcycle 11 is generally mounted on a suitable carrier, such as a truck or trailer, the floor which is shown at 28. The motorcycle is generally held in an upright position on the floor 28 by one or more straps 30, each of which is cinched over the chassis and attached at its ends at 31 and 32 to the floor.

In accordance with the present invention, an adjustable blocking device, generally indicated at 33, is provided to prevent flexing of the suspension system while the motorcycle is being transported to prevent wear and fatigue of the various parts thereof, such as the telescoping tubes, springs, oil seals and the like.

The device 33 comprises a pair of elongate strut members 34 and 35 which are preferably formed of metal and have confronting flat faces 36 extending the lengths of the members. Oppositely extending convex reinforcing sections 37 are formed along medial portions of the struts to strengthen them.

A plurality of equally spaced holes 38 are formed along the convex section 37 of the upper strut member 34 and a single hole 40 is formed in the corresponding section of the lower strut member 35, enabling a bolt 41 to be passed through the hole 40 and a selected one of the holes 38 to coarsely adjust the overall length of the device. A locking ring member 42 is formed to slidably embrace both strut members 34 and 35, and when it is slid into its locking position, shown in FIGS. 2 and 3, the member 42 cooperates with the bolt 41 to lock the strut members in colinear relation. Tabs 43 extend from opposite ends of the ring member 42 to facilitate sliding of said ring member along strut member 34 and into interlocking engagement with the strut member 35.

A threaded rod 44 is integrally attached, as by welding, to the upper end of strut member 34 for insertion into the fender opening 27 and into the steering stem 24 to interlock the upper end of the blocking device with the steering stem 24. A flanged nut member 45 is threaded on the rod 44 for engagement with the underside of the fender 16, the nut being adjustable along the length of the rod to finely adjust the length of the blocking device. A jam nut 46 is also threaded on the rod 44 to lock nut member 45 in place.

A foot 47 is integrally secured, as by welding, to the lower end of strut member 35 and is preferably formed with a concave undersurface to conform to the generally arcuate contour of the tread surface of tire 13. A depending projection 48 is also formed on the foot 47 to interlock with one of the depressions 14 in the tire tread to thus prevent displacement of the lower end of the blocking device due to jostling or bouncing of the motorcycle when it is being transported.

When mounting the motorcycle for transportation, the blocking device is preferably adjusted to fit between the tire 13 and fender 16 when the suspension springs are stressed the desired amount by selective placement of the bolt 40 in one of the holes 38 and by adjustment of the nut member 45. The device is then interposed between the tire and fender 16, and strap 30 is cinched down, compressing the suspension system until the fender rests against the strut member 34. Thus, when in transit, the blocking device transmits all bouncing and jostling forces directly from the chassis through the wheel 12 to the floor 28 of the carrier.

When not in use, the locking ring 42 may be raised out of embracement with the strut member 35 and the two strut members 34 and 35 may then be swung about the bolt 41 into a small package for storing purposes.

FIG. 5 illustrates an attachment for adapting the blocking device to certain types of motorcycles or other vehicles which do not have a suitable opening for interlockingly receiving the threaded rod 44. Such attachment comprises a cup-shaped element 50 which is screw-threaded onto the rod 44 and is adapted to frictionally engage a portion of the chassis, such as the undersurface of a fender similar to fender 16.

From the foregoing it will be apparent that my novel blocking device serves to prevent undue loading of the shock absorbing suspension system of a racing motorcycle or like vehicle while it is being fastened in place on a carrier for transport to a place of use, and thereafter when it is in transit to said place.

Although emphasis herein has been placed on the use of metal in the fabrication of the parts of my blocking device, it should be understood that any other suitable material, e.g., a suitable plastic, can be used in lieu of metal within the scope of my invention. This is particularly true with respect to the strut members corresponding to strut members 34 and 35 of blocking device 33.

I claim:

1. A device for preventing flexing of a resilient suspension system interconnecting a vehicle chassis and a vehicle wheel, said wheel including a tire having a tread thereon, which comprises:

a pair of elongate members adapted to be positioned between a part of said chassis and said wheel, means for adjustably securing said members together to extend to any one of a choice of overall lengths, first means at the remote end of one of said members for interlocking engagement with the tread of said tire, and second means at the remote end of the other of said members for engagement with said part of said chassis.

2. A device as defined in claim 1 wherein said second means comprises means for interlocking with said part of said chassis.

3. A device as defined in claim 1 wherein the adjustable securing means comprises means for pivoting one of said members to the other at any of different points along the length of one of said members, and means for locking said members in colinear relationship between said wheel and said part of said chassis.

4. A device as defined in claim 1 wherein said second means is adjustable for proper fitting of said device between said part of said chassis and said wheel.

5. A device as defined in claim 4 wherein said part of said chassis has an opening therein and wherein said second means comprises a screw-threaded rod on said remote end of said other of said members for insertion into said opening and a nut threadedly engageable with said rod for tightening engagement with said part of said chassis.

6. A device as defined in claim 1 wherein the adjustable securing means comprises a plurality of openings spaced along a first one of said members;

a fastening element mountable on the second one of said members and selectively engageable with one of said openings, and means for locking said members in colinear relationship between said wheel and said part of said chassis.

7. A device as defined in claim 1 wherein the securing means comprises a locking slide member adapted to slidably embrace one of said members and be slidable into and out of embracement with the other of said members.

8. A device as defined in claim 1 wherein said tread has a series of indentations therearound, and said first means has a projection adapted to engage one of said indentations.

9. A device as defined in claim 1 wherein said members are formed of sheet material having flat faces and respective centrally located convex sections extending along the length thereof, said flat faces being in confrontation and said convex sections extending outwardly away from each other in the assembled device, the adjustable securing means comprising a plurality of openings in the convex section of a first one of said members and spaced along said convex section of that member, an opening in the convex section of the second one of said members, and a fastening member mountable in any one of said openings in the first member and in the opening in the second member.

10. A device as defined in claim 9 including a locking member slidably embraceable of the first member and slidable to embrace the second member for locking said members in colinear relationship.

* * * * *